United States Patent

[11] 3,630,027

| [72] | Inventor | Andrew A. Lambert<br>1768 Harding Street, Wichita, Kans. 67202 |
|---|---|---|
| [21] | Appl. No. | 850,847 |
| [22] | Filed | Aug. 18, 1969 |
| [45] | Patented | Dec. 28, 1971 |

[54] HYDRAULIC LINEAR AMPLIFIER APPARATUS FOR POWER BRAKE STRUCTURES
2 Claims, 8 Drawing Figs.

[52] U.S. Cl. ............................................... 60/54.6 A, 60/54.5 HA
[51] Int. Cl. ................................................. F15b 7/00, F16k 31/12
[50] Field of Search ........................................ 60/54.5 A, 54.6 A, 54.5 HA, 54.6

[56] References Cited
UNITED STATES PATENTS

| 2,321,479 | 6/1943 | Freeman | 60/54.5 A X |
| 2,597,404 | 5/1952 | Teske | 60/54.5 HA |
| 2,618,930 | 11/1952 | Quinn | 60/54.5 HA X |
| 2,642,720 | 6/1953 | Deardorff | 60/54.6 A |

*Primary Examiner*—Martin P. Schwadron
*Assistant Examiner*—A. M. Zupcic
*Attorney*—John H. Widdowson ABSTRACT: This invention is hydraulic linear amplifier apparatus operable through fluid or direct mechanical linkage structures to provide an increased hydraulic force for application against brakeshoe structures from a given available actuator force. More particularly, this invention is a hydraulic linear amplifier apparatus having a primary assembly operable through fluid pressure to actuate a secondary amplifier assembly through cooperating with control valve assemblies to progressively achieve an increased fluid force applied to operate the brakeshoe drum members.

ANDREW A. LAMBERT

ATTORNEY

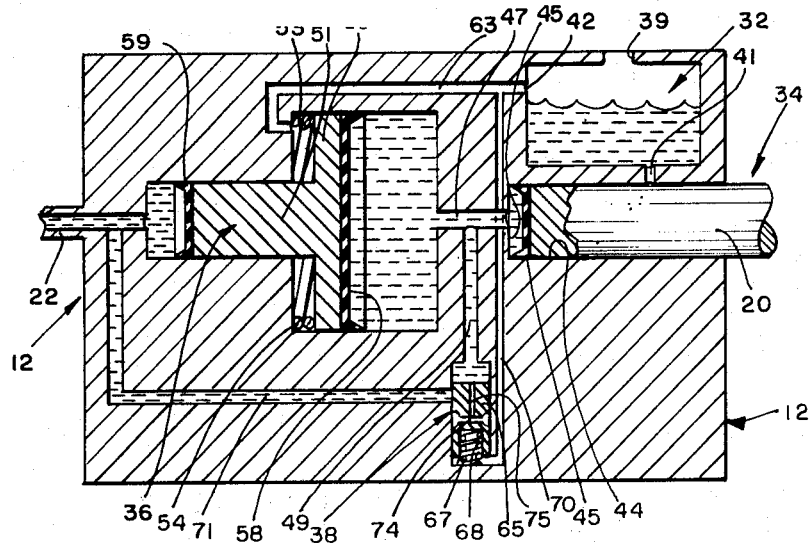

HYDRAULIC LINEAR AMPLIFIER APPARATUS FOR POWER BRAKE STRUCTURES

Various types of amplifier structures are known in the prior art but none are operable so as to be easily mounted within a pressure power brake system to achieve hydraulic linear amplification. Also, the prior art structures are not operable so as to achieve actuator power amplification as required on reaching the critical point of needing immediate increased force applied to the brakedrum structures. Also, the prior art linear amplification structures are generally complicated in nature; expensive to manufacture; and must be custom fitted or initially built into the power brake systems requiring considerable labor and expense.

In one preferred embodiment of this invention, a hydraulic linear amplifier apparatus is provided readily mountable within an existing power brake system. More particularly, the hydraulic linear amplifier apparatus is operable to receive power from a master cylinder actuated by a brake pedal assembly to move a primary assembly against fluid within the hydraulic linear amplifier apparatus. The fluid is transferred therefrom through conventional fluid discharge lines into the brake drums of the front and rear brake assemblies for actuating brake liners against respective brakedrums in a conventional manner. The hydraulic linear amplifier apparatus may be constructed having a main housing means provided with a fluid reservoir means; a primary assembly; a secondary amplifier assembly; and a control valve assembly operably connected to the primary amplifier assembly and the secondary amplifier assembly for fluid discharge from the housing means into the fluid discharge line. The housing means can be of any shape so as to receive the aforementioned elements therein for cooperative operation. The reservoir means receives hydraulic fluid through an inlet opening having a return opening above the fluid level. The primary assembly includes a primary piston axially movable through operation of the master cylinder including a shaft positioned within a fluid supply bore. The fluid supply bore has an opening connected to the reservoir means so as to receive hydraulic fluid therefrom and integral with a first outlet channel which cooperates with the secondary amplifier assembly and the control valve assembly. The secondary amplifier assembly includes a main amplifier piston mountable within an enlarged bore having a biasing means therewith to bias the piston to the released or the nonworking condition. The amplifier piston includes an enlarged head section at one end integral with a control shaft and exposed ends of the shaft and head section are provided with sealing cup members. The biasing means includes a compression spring mounted against rear side of the actuator head section. The bore is provided with an opening connected back through the return channel to the reservoir means. The control valve assembly includes a main valve member mounted within a valve chamber and biased into an upper open condition by a compression spring member. The valve chamber is connected from the area of the spring member by an airflow channel to the reservoir means. The valve member is provided with transversely intersecting fluid flow bores which permit and restrict fluid flow to flow through a control channel, an intermediate channel, and the outlet channel to control fluid flow through an outlet line to the brakedrum assemblies. In this operation, the valve member is operable under pressure differential to vary the force of the fluid into the outlet line.

In the second embodiment of a hydraulic linear amplifier apparatus of this invention, a reservoir means is provided operably connected through a control valve assembly to a primary assembly for fluid discharge into an outlet line connected to the brakedrum assemblies. In this embodiment, a straight mechanical operation is provided through a primary piston connected to the master cylinder which is operable on movement to provide fluid flow through the outlet line and against the control valve assembly. On reaching a certain fluid pressure, the control valve assembly opens to aid in force on the primary piston to achieve the desired amplification.

In a third embodiment of this invention, a hydraulic linear amplifier apparatus is provided to receive fluid pressure from the master cylinder to actuate a primary assembly mounted within a housing member for fluid discharge through an outlet line to the brakedrum assemblies. The primary assembly is provided with an enlarged piston member having an enlarged head section integral with a shaft biased to the nonuse condition. The shaft of the primary piston is provided with a valve member having a stem biased into the closed condition. The valve member closes on outward movement of the primary piston to achieve a direct fluid amplification due to the difference in sizes of the areas being acted upon.

In a fourth embodiment of this invention, the same is substantially mounted thereon and being provided with a direct primary piston member acting by fluid pressure on a secondary amplifier assembly having a valve means movable to the closed condition from the open condition to achieve linear fluid amplification.

One object of this invention is to provide hydraulic linear amplifier apparatus mountable on either fluid or mechanically actuated power brake structures overcoming the aforementioned disadvantages of the prior art devices.

One other object of this invention is to provide a hydraulic linear amplifier apparatus readily connectable in a minimum amount of time to existing power brake systems to achieve greater efficiency and fluid power output for greater safety.

Still, one object of this invention is to provide a hydraulic amplifier apparatus having a primary assembly to receive fluid from a reservoir means to apply the same against a secondary amplifier assembly whereupon the secondary amplifier is provided with a piston means to achieve linear amplification through cooperation with a control valve assembly for discharge to an output line connected to conventional power brake drum structures.

Still, one further object of this invention is to provide a hydraulic linear amplifier apparatus operable through the use of hydraulic principles to achieve at a predetermined point on movement of a control piston member a fluid amplification to the outlet line connected to brakedrum structures.

Another object of this invention is to provide a hydraulic linear amplifier apparatus operable to receive fluid or mechanical actuator force from a brake cylinder so as to operate against a primary amplifier assembly to achieve hydraulic fluid amplification.

One further object of this invention is to provide hydraulic linear amplifier apparatus readily connectable to existing power brake systems which are economical to manufacture; easy to install; substantially maintenance free; and providing increased fluid pressure against conventional brakedrum structures for added safety.

Various other objects, advantages, and features of the invention will become apparent to those skilled in the art from the following discussion, taken in conjunction with the accompanying drawing, in which:

FIGS. 3 and 4 are substantially identical to FIG. 2 showing various stages of operation of the hydraulic linear amplifier apparatus of this invention;

FIGS. 5 and 6 are sectional view illustrating various stages of operation of a second embodiment of the hydraulic linear amplifier apparatus of this invention;

Figure 1:
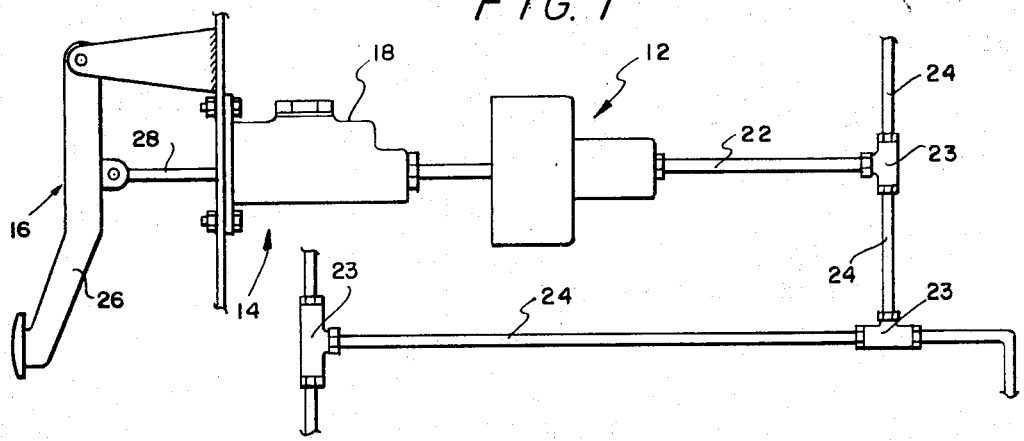
FIG. 1 is a schematic diagram illustrating a hydraulic linear amplifier apparatus of this invention mounted in a conventional power brake system.

The following is a discussion and description of preferred specific embodiments of the new hydraulic linear amplifier apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a hydraulic linear amplifier apparatus, indicated generally at 12, is shown as mounted within a power brake system 14. The power brake system 14 is first provided with a brake pedal assembly 16 connected to a master cylinder 18 which is operable to move a primary piston 20 within the hydraulic linear amplifier apparatus 12. From the amplifier apparatus 12, it is noted that an outlet line 22 is connected through various tee members 23 and fluid conductor lines 24 so as to provide the required pressure fluid to front and rear brake assemblies to actuate brake drum structures (not shown) in a conventional manner. The brake pedal assembly 16 is provided with an actuator pedal 26 connected through a linkage rod 28 to achieve fluid pressure from the master cylinder 18 in a substantially conventional manner. If it understood that the master cylinder 18 is provided with brake fluid as required in order to move the primary piston 20.

Figure 2:
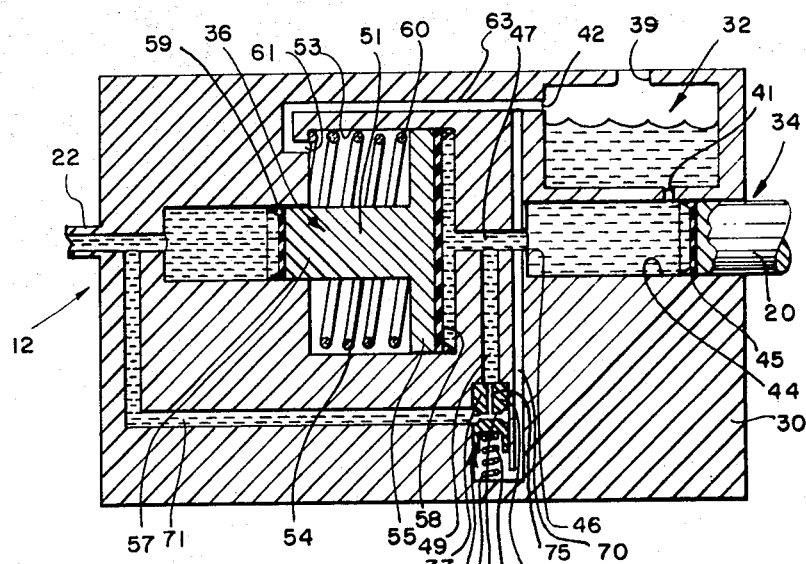
FIG. 2 is a sectional view of a hydraulic linear amplifier apparatus of this invention.

As shown in FIG. 2, the hydraulic linear amplifier apparatus 12 is provided with a main housing means 30 which may be a single compact unit having therewith a reservoir means 32; a primary assembly 34 to receive fluid from the reservoir means 32; a secondary amplifier assembly 36 to receive fluid from the primary assembly 34; and a control valve assembly 38. The control valve assembly 38 is operably controlled through channels to the cooperating primary assembly 34 and the secondary amplifier assembly 36 and, additionally, through the outlet line 22 to the brakedrum assemblies.

The reservoir means 32 may be integral with the housing means 30 or provided with a separate structure having an inlet opening 39; a discharge opening 41; and a fluid return opening 42 above the fluid level maintained within the reservoir means 32.

The primary assembly 34 includes the primary piston 20 slidable mounted within a fluid supply bore 44. The inner end of the primary piston 20 is provided with a cup member 45 which is positioned, when in the nonuse condition of FIG. 2, outwardly of the discharge opening 41 of the reservoir means 22. The inner end of the fluid supply bore is provided with an outlet opening 46 leading into a first outlet channel 47 communicating with the secondary amplifier assembly 36. The first outlet channel 47 is operably connected through an intermediate channel 49 to the control valve assembly 38 for reasons to become obvious.

The secondary amplifier assembly 36 is provided with a main amplifier piston 51 movable within a control chamber 53 and biased in the nonuse condition by a biasing means 54. The amplifier piston 51 is provided with a main head section 55 integral with a shaft section 57 having the outer ends thereof provided with sealing cup members 58 and 59, respectively. The amplifier piston 51 is of a T-shape in transverse cross section having the head section 55 receiving fluid thereagainst from the first inlet channel 47 for achieving fluid amplification as will become obvious. The biasing means 54 is a compression spring member 60 placed against the rear surface of the head section 55 to bias the same in the nonuse condition. The control chamber 53 is provided with an opening 61 connected through an air return channel 63 to the reservoir means 32.

The control valve assembly 38 includes a main valve member 65 mounted within a valve chamber 67 and biased into the nonuse condition as by a compression spring member 68. The valve chamber 67 is connected to the intermediate channel 49; to an airflow channel 70 to the reservoir means 32; and through a fluid control channel 71 to the outlet line 22. More particularly, the valve member 65 is provided with intersecting fluid flow bores 74 and 75 so that, when in the nonuse condition, the valve member 65 permits restricted transfer of fluid through the intermediate channel 49 and the control channel 71.

Figure 3:
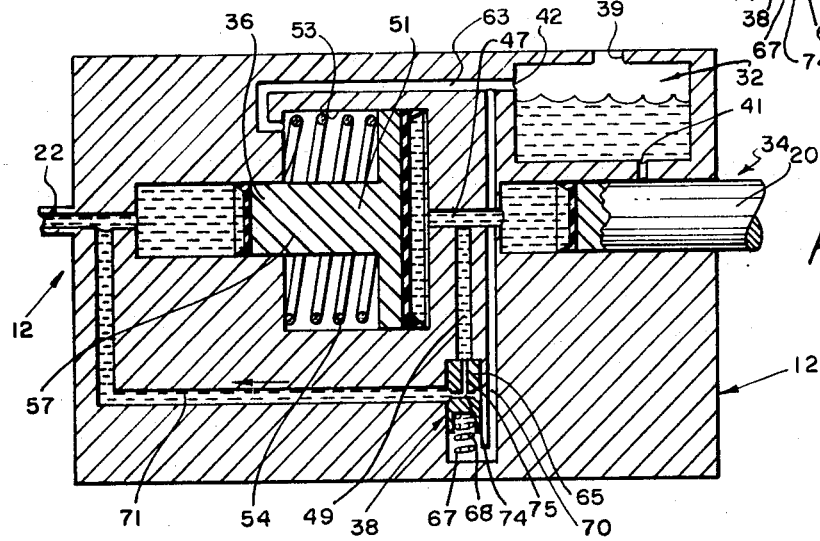

In the use and operation of the hydraulic linear amplifier apparatus 12 of this invention as shown in FIGS. 3 and 4, it is seen that the first step is actuation of the brake pedal assembly 16 to operate the master cylinder 18 to cause inward movement of the primary piston 20. This causes pressure fluid to move against the amplifier piston 51 and additionally conveyed through the intermediate channel 49 against the valve member 65 of the control valve assembly 38. On this initial movement, it is seen that fluid supply is ceased from the reservoir means 32 on movement of the sealing cup member 45 past the opening 41. On further movement of the primary piston 20 to the position of FIG. 4, it is seen that the valve member 65 is moved downwardly due to the increased fluid pressure thereagainst relative to the small diameter of the fluid flow bores 74 and 75. This causes the valve member 65 to have its upper portion 77 extended transversely of the control channel 71 whereupon the pressure fluid thereupon acts against the amplifier piston 51 to achieve maximum amplification of the hydraulic fluid through the outlet line 22 to the brakedrum assemblies. It is seen, therefore, that this causes increased hydraulic pressure to the brakedrum assemblies for actuation of the brakeshoes at a time of substantially full movement of the amplifier piston 51 to achieve the maximum operation of the brakedrum assemblies for safety purposes.

In a second embodiment of a hydraulic linear amplification apparatus 79 as shown in FIGS. 5 and 6, it is seen that a reservoir means 81 is operably connected through a control valve assembly 83 and a primary assembly 84 for fluid discharge through the outlet line 22 to the brakedrum assemblies. The reservoir means 81 is provided with an inlet opening 86 and a first outlet channel 88 to supply fluid to the control valve assembly 83.

The primary assembly 84 includes a main primary piston 90 movable within a fluid actuator bore 91. The primary piston 90 includes a main face section 93 integral with an actuator shaft member 95 which is actuated through fluid or mechanical means on operation of the master cylinder 18. The fluid actuator bore 91 is provided with spaced openings 97 and 98, respectively connected to a discharge channel 99 and an intermediate channel 101 to the outlet line 22 and the control valve assembly 83. In the inoperative condition, the face section 93 of the primary piston 90 extends rearwardly of the opening 98 for reasons to become obvious.

The control valve assembly 83 includes a valve member 102 mounted within a housing member 104 biased in one direction by a spring member 105. The housing member 104 is operably connected to the first outlet channel 88; a control channel 107; and the intermediate channel 101. The valve member 102 is of a generally cylindrically shape adapted to be moved axially through the use of the spring member 105 and the hydraulic fluid pressure thereagainst to connect and disconnect fluid flow between the intermediate channel 101 and the control channel 107.

In the use and operation of the hydraulic linear amplifier apparatus 79 of this invention, it is seen that primary piston 90 is first movable axially on actuation through the brake pedal assembly 16 and the master cylinder 18. The first movement of the primary piston 90 causes the face section 93 to be moved past the opening 98 which leads into the intermediate channel 101. Thereupon, fluid is applied through the discharge line 99 and the control channel 107 against the valve member 102 of the control valve assembly 83. On reaching a predetermined pressure, it is obvious that the pressure in the control channel 107 against the valve member 102 overcomes the force of the spring member 105 and moves to the right as viewed in FIG. 6. Thereupon, it is seen that the fluid being moved by the primary piston 90 moves through the control channel 107, the control valve assembly 83, and the intermediate channel 101 so as to also act against the opposite end of the face section 93 of the primary piston 90. This operation provides hydraulic amplification to aid in movement of the primary piston 90 by fluid acting on both sides proportionate to the diameter of the shaft member 95.

Figure 7:
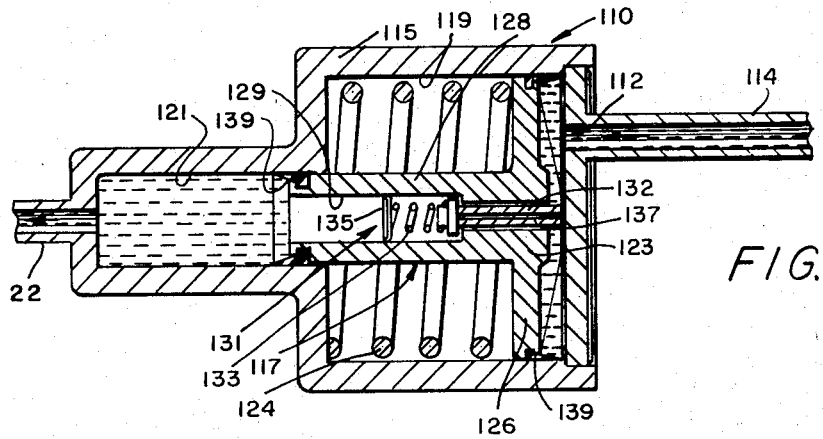
FIG. 7 is a sectional view illustrating a third embodiment of the hydraulic linear amplifier apparatus of this invention.

In the third embodiment of a hydraulic linear amplifier apparatus 10 as shown in FIG. 7, the same is readily connectable through an opening 112 and inlet line 114 to receive fluid pressure through the use of the brake pedal assembly 16 and the master cylinder 18 for discharge therefrom through an outlet line 22 to the brakedrum assemblies. More particularly, the linear amplifier apparatus 110 includes a housing means 115 having a secondary amplifier assembly 117 therein. The housing means 115 is provided with a main actuator chamber 119 integral with an outlet bore 121 which, in turn, is connected to the outlet line 22.

The secondary amplifier assembly 117 includes a main piston member 123 of T-shape in transverse cross section biased into the nonuse condition by a compression spring member 124. More particularly, the amplifier piston member 123 is provided with a head section 126 integral with a rearward shaft section 128 having an elongated bore 129 therein. Within the bore 129 is mounted a control valve assembly 131. The control valve assembly 131 includes an actuator stem 132 biased to the closed condition as by a spring member 133 held therein by a retainer plate 134. The actuator stem 132 is provided with a central hole 137 so that the same is operable in the nonuse condition of FIG. 7 to allow fluid flow therethrough but is biased to the closed position when in the operating condition. The head section 126 and the shaft section 128 are provided with sealing cup members 139 for the proper operation.

In the use and operation of the hydraulic linear apparatus 110 of this invention, it is obvious that actuation of the master cylinder 18 provides pressure fluid through the opening to move the secondary amplifier piston member 123 to the left as viewed in FIG. 7. This operates to close the actuator stem 132 of the control valve assembly 131 whereupon the greater area of the face of the head section 126 results in an amplification to achieve a greater power output than would be expected from the primary fluid pressure input from the master cylinder 18.

Figure 8:
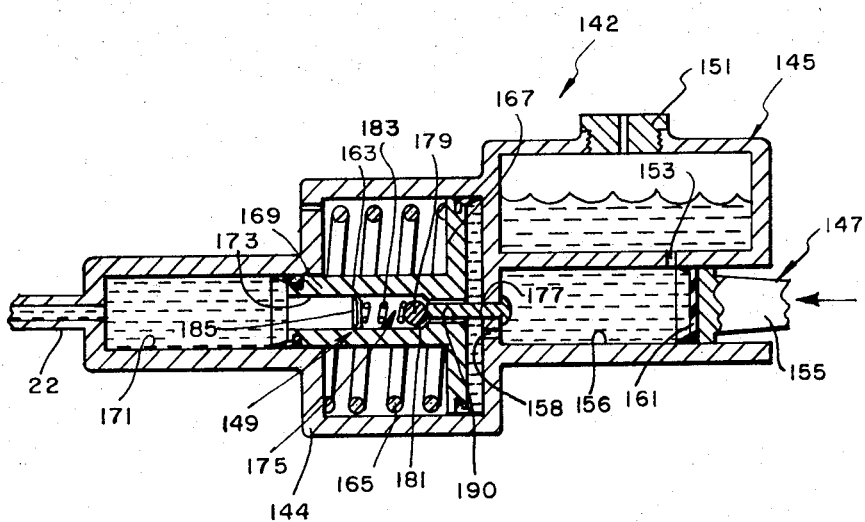
FIG. 8 s a fourth embodiment of a hydraulic linear amplifier apparatus of this invention.

In the fourth embodiment of this invention as shown in FIG. 8, a hydraulic linear amplifier apparatus 142 is provided with a housing means 144 having a reservoir means 145 operably connected to a primary assembly 147 and a secondary amplifier assembly 149 for discharge through the outlet line 22 to the brakedrum assemblies. The reservoir means 145 is provided with an upper fluid entrance plug 151 and a discharge opening 153 into the primary amplifier assembly 147.

The primary assembly 147 includes a primary piston 155 which can be actuated through fluid pressure or positive mechanical movement on operation of the master cylinder 18. The primary piston 155 is movable within a fluid supply bore 156 for conveyance of fluid through a discharge opening 158 into the secondary amplifier assembly 149. The primary piston 155 is provided with a sealing cup 161 on the inward end and is normally positioned outwardly of the fluid discharge opening 153 in the nonuse condition of FIG. 6.

The secondary amplifier assembly 149 includes a main amplifier piston 163 of T-shape in transverse cross section biased into the nonuse condition by a compression spring member 165. The amplifier piston 163 is provided with a main actuator head section 167 integral with a shaft section 169 within a discharge bore 171 in the housing means 144. The shaft section 169 includes an elongated bore 173 having a control valve assembly 175 mounted therein. The control valve assembly 175 is provided with a valve pin member 177 and a ball member 179 biased against a seal portion 181 by a spring member 183 which, in turn, is held therewith by a retaining plate 185. The pin member 177 is anchored to the housing means 144 and is of a diameter small than a hole 190 in the head section 167 for fluid flow therebetween when the ball member 179 is held in the open condition.

In the use and operation of the hydraulic linear amplifier apparatus 142 of this invention, it is obvious that the primary piston 155 is moved inwardly on receiving fluid from the master cylinder 18. This causes fluid within the fluid supply bore 156 to move against the amplifier piston 163 for resultant movement to the left as viewed in FIG. 8. Next, the ball member 179 is biased by the spring member 183 to the closed condition. This causes an amplification due to the difference in areas of the head section 167 and the shaft section 169 so as to achieve an increased fluid pressure flow through the outlet line 22 to the brake drum assemblies.

It is seen that the hydraulic linear amplifier apparatus of this invention are readily installed in existing power brake systems and may be operated through fluid or direct mechanical linkages so as to achieve an increased hydraulic fluid pressure relative to that received from a given source such as a conventional master cylinder. The hydraulic linear amplifier apparatus are generally uncomplicated so as to be maintenance free under all conditions of operation. Also, the hydraulic linear amplifier apparatus of this invention are readily movable through control means to achieve the proper hydraulic linear amplification after certain linear movement of the amplifier piston assemblies.

While the invention has been described in conjunction with preferred specific embodiments thereof it will be understood that this discussion is intended to illustrate and not to limit the scope of the invention as described by the following claims.

I claim:

1. A hydraulic linear amplifier apparatus adapted to be mounted in a power brake system, comprising:
  a. a reservoir means having fluid therein,
  b. a primary assembly operably connected to said reservoir means to receive fluid therefrom having a movable primary piston engageable with said fluid to impart pressure thereto,
  c. a secondary amplifier assembly connected to said reservoir means, said primary assembly, and a pressure outlet line connected to a brake drum structure of the power brake system,
  d. said secondary amplifier assembly to receive said fluid from said primary assembly to impart pressure to working fluid in said outlet line,
  e. a control valve assembly operably connected to said primary assembly, said secondary amplifier assembly, and said reservoir means, said control valve assembly having a main valve member with a fluid flow channel therethrough open under one set of conditions and said primary piston is moved to impart said fluid against said secondary amplifier assembly and through said control valve assembly to said outlet line under one set of conditions and, on reaching a second set of conditions, said valve member closes said flow channel to said outlet line to apply all of said fluid against said secondary amplifier assembly for fluid pressure amplification of said working fluid through said outlet line,
  f. said secondary amplifier assembly having an amplifier piston mounted with a housing means and biased into the nonuse condition by a spring member,
  g. said amplifier piston having an enlarged head section at one end to receive said fluid thereagainst and a smaller head section at the opposite end to impart pressure to said working fluid into said outlet line,
  h. said control valve assembly having a valve member permitting restricted fluid flow from said fluid to said outlet line in said first set of conditions and biased by a valve spring member to said first set of conditions, and
  i. said fluid on reaching a predetermined pressure overcomes the force of said valve spring member and moves said valve member to the closed condition for maximum pressure of said fluid in moving said amplifier piston.

2. A hydraulic linear amplifier apparatus as described in claim 1, wherein:
  a. said primary assembly, said second amplifier assembly, and said control valve assembly interconnected by a common first fluid channel to receive said fluid, and
  b. said control valve assembly is connected to said reservoir means by an airflow channel and selectively interconnects said first fluid channel to a control channel integral with said outlet line.

* * * * *